(12) United States Patent
Mitsui et al.

(10) Patent No.: US 8,950,940 B2
(45) Date of Patent: Feb. 10, 2015

(54) SLIDING APPARATUS

(75) Inventors: Yasuhiro Mitsui, Chiba (JP); Tetsuya Katsuta, Chiba (JP)

(73) Assignee: Mitsubishi Steel Mfg. Co., Ltd., Tokyo (JP)

( * ) Notice: Subject to any disclaimer, the term of this patent is extended or adjusted under 35 U.S.C. 154(b) by 35 days.

(21) Appl. No.: 13/703,964

(22) PCT Filed: Jun. 13, 2011

(86) PCT No.: PCT/JP2011/063503
§ 371 (c)(1),
(2), (4) Date: Dec. 13, 2012

(87) PCT Pub. No.: WO2011/158789
PCT Pub. Date: Dec. 22, 2011

(65) Prior Publication Data
US 2013/0089281 A1 Apr. 11, 2013

(30) Foreign Application Priority Data

Jun. 15, 2010 (JP) .................................. 2010-136344
Sep. 17, 2010 (JP) .................................. 2010-209531

(51) Int. Cl.
| F16C 29/00 | (2006.01) |
| F16C 29/06 | (2006.01) |
| H04M 1/00 | (2006.01) |
| H04M 1/02 | (2006.01) |
| G03B 11/04 | (2006.01) |

(52) U.S. Cl.
CPC ........... H04M 1/0237 (2013.01); G03B 11/043 (2013.01)
USPC ......................................... 384/10; 455/575.4

(58) Field of Classification Search
USPC ........... 384/7, 10, 21, 22; 455/575.4; 396/448
See application file for complete search history.

(56) References Cited

U.S. PATENT DOCUMENTS 6,135,652 A * 10/2000 Owashi et al. ................. 396/448
6,398,426 B1 * 6/2002 Takanashi ..................... 396/448
(Continued)

FOREIGN PATENT DOCUMENTS

| EP | 1796351 | 6/2007 |
| JP | 2005-303662 | 10/2005 |

(Continued)

OTHER PUBLICATIONS

Extended European Search Report dated Oct. 21, 2013.
(Continued)

*Primary Examiner* — James Pilkington
(74) *Attorney, Agent, or Firm* — IPUSA, PLLC

(57) ABSTRACT

The sliding apparatus includes a substrate fixed to a main body, a slide plate being fixed to a sub-body and being slidable between a closed position and an open position in an opening/closing direction, a hole formed in the slide plate, a sloped surface part being formed in the main body, and being engaged with the hole in the closed position, and including a sloped surface being sloped toward a rear direction in the opening/closing direction, a slide guiding part guiding the slide plate in a sliding direction, a restricting part restricting movement of a closing direction end of the slide plate in the front/rear direction during an initial stage of sliding the slide plate from the closed position to the open position, and a sloped part being formed in a closing direction end of the slide guiding part and being sloped in a rear direction.

10 Claims, 10 Drawing Sheets

(56) References Cited

U.S. PATENT DOCUMENTS

| | | |
|---|---|---|
| 7,938,586 B2 * | 5/2011 | Matsumoto .................... 396/448 |
| 8,256,906 B2 * | 9/2012 | Kao et al. ...................... 396/448 |
| 2007/0197270 A1 | 8/2007 | Kim |
| 2008/0132303 A1 * | 6/2008 | Naukkarinen et al. ..... 455/575.4 |
| 2009/0279884 A1 | 11/2009 | Matsumoto |

FOREIGN PATENT DOCUMENTS

| | | |
|---|---|---|
| JP | 2006-074444 | 3/2006 |
| JP | 2009-272908 | 11/2009 |
| WO | WO 2005/101799 | 10/2005 |
| WO | WO 2006/025184 | 3/2006 |

OTHER PUBLICATIONS

International Search Report mailed on Sep. 13, 2011.

* cited by examiner

SLIDING APPARATUS

The present international application is based on Japanese Patent Application Nos. 2010-136344 and 2010-209531 filed on Jun. 15, 2010 and Sep. 17, 2010, respectively, the entire contents of which are incorporated herein by reference.

INDUSTRIAL APPLICABILITY

The sliding apparatus of the present invention can be suitably applied to an imaging apparatus or a portable telephone having an imaging device including a sub-body part such as a cover or other various electronic devices including a sub-body part that sequentially perform a wheelie movement, a tail lifting movement, and a parallel movement.

TECHNICAL FIELD

The present invention relates to a sliding apparatus including a main body part and a sub-body part, having the capability of sliding the sub-body part relative to the main body part.

BACKGROUND ART

As a known electronic device constituting an imaging apparatus or a portable telephone including an imaging device, there is one having a main body part including an imaging apparatus main body, various operation buttons, and an input/output interface such as a display part, a sub-body part serving as a cover that installs and protects mainly a lens part of the imaging apparatus main body during an unused state, and a sliding apparatus sliding the sub-body part relative to the main body part.

With this electronic device during a using state, a lens part is exposed by sliding the sub body part (cover) coupled to the main body part by way of the sliding apparatus. Thereby, photographing can be performed.

Patent Document 1 discloses this type of electronic device. The sliding apparatus disclosed in Patent Document 1 has a slide plate fixed to a cover and equipped with a pair of left/right arm parts. Projecting parts, which project outward in the left and right directions, are provided at the front/rear (two locations) of the pair of left/right arm parts. Two pairs of left/right cam grooves having a lifting function are provided in a manner extending toward the main body part in the front/rear direction and sloped downward at its front part.

This configuration can position a surface of the cover and a surface of the main body part on the same plane in a state where the cover is closed and positioning the cover to a position that superposes a part of a surface side of the surface of the main body having no lens part arranged thereon.

RELATED ART REFERENCE

Patent Document

Patent Document 1: Japanese Laid-Open Patent Publication No. 2009-272908

DISCLOSURE OF THE INVENTION

Problem to be Solved by Invention

With the sliding apparatus having such configuration, the following problems occur in a case where the user performs an operation of shifting the cover from an open state to a closed state. Normally, in a case where the user performs an operation of opening the cover (particularly in an initial state of the operation), a closing direction end of the cover is moved in an opening direction while being depressed in a thickness direction of the cover (direction toward the back of the cover).

With the sliding apparatus disclosed in Patent Document 1, the lifting force exerted to a downward inclined part of the pair of left/right cam grooves causes the entire cover to be lifted upward. Thereby, there is a problem in which an opposing force is excessively exerted to the closing direction end in response to the user depressing the cover in the direction toward the rear of the cover.

Further, with the sliding apparatus disclosed in Patent Document 1, due to the two pairs of left/right cam grooves being provided, an opposing force is excessively exerted to the sloped parts in a direction opposite to the opening direction. Thus, there is a problem in which an operation opposing force opposite to the opening direction becomes excessive. That is, it is not necessarily easy to increase operability by attaining an operation feel desired by the user.

Thus, in view of the above-described problems, it is an object of the present invention to provide a sliding apparatus that can increase operability and commercial practicability.

Means for Solving Problem

In order to solve the above-described problems, the present invention provides a substrate that is fixed to a main body part; a slide plate that is fixed to a sub-body part and is slidable between a closed position and an open position in an opening/closing direction; a hole part that is formed in the slide plate; a sloped surface part that is formed in the main body part, and is engaged with the hole part in the closed position, and includes a sloped surface being sloped toward a rear direction in the opening/closing direction; a slide guiding part that guides the slide plate in a sliding direction; a restricting part that restricts movement of a closing direction end of the slide plate in the front/rear direction during an initial stage of sliding the slide plate from the closed position to the open position; a sloped part that is formed in a closing direction end part of the slide guiding part and is sloped in a rear direction.

Effect of the Invention

With the sliding apparatus of the present invention, commercial practicability can be increased by attaining both convenience and operability.

EMBODIMENTS OF THE INVENTION

In FIGS. 1-7 used for describing the first embodiment of the present invention, "C" indicates a center line of a width direction, "OUT" indicates an outer side of the width direction (separating from the center line C in the width direction), and "IN" indicates an inner side of the width direction (approaching the center line C in the width direction). "F" indicates a front direction of a front/rear direction and indicates a direction extending from a main body part 1 to a sub body part 3 according to the first embodiment of the present invention. "R" indicates a rear direction of the front/rear direction. "CL" indicates a closing direction in an open/close direction, and "OP" indicates an opening direction in the open/close direction.

When viewed from the opening direction OP where the front direction F is oriented upward, the outer side OUT of a right side area in the width direction relative to the center line C in the width direction corresponds to a right side and the inner side IN of the right side area corresponds to a left side. The outer side OUT of a left side area corresponds to a left side, and the inner side IN of the left side area corresponds to a right side.

Figure 1:
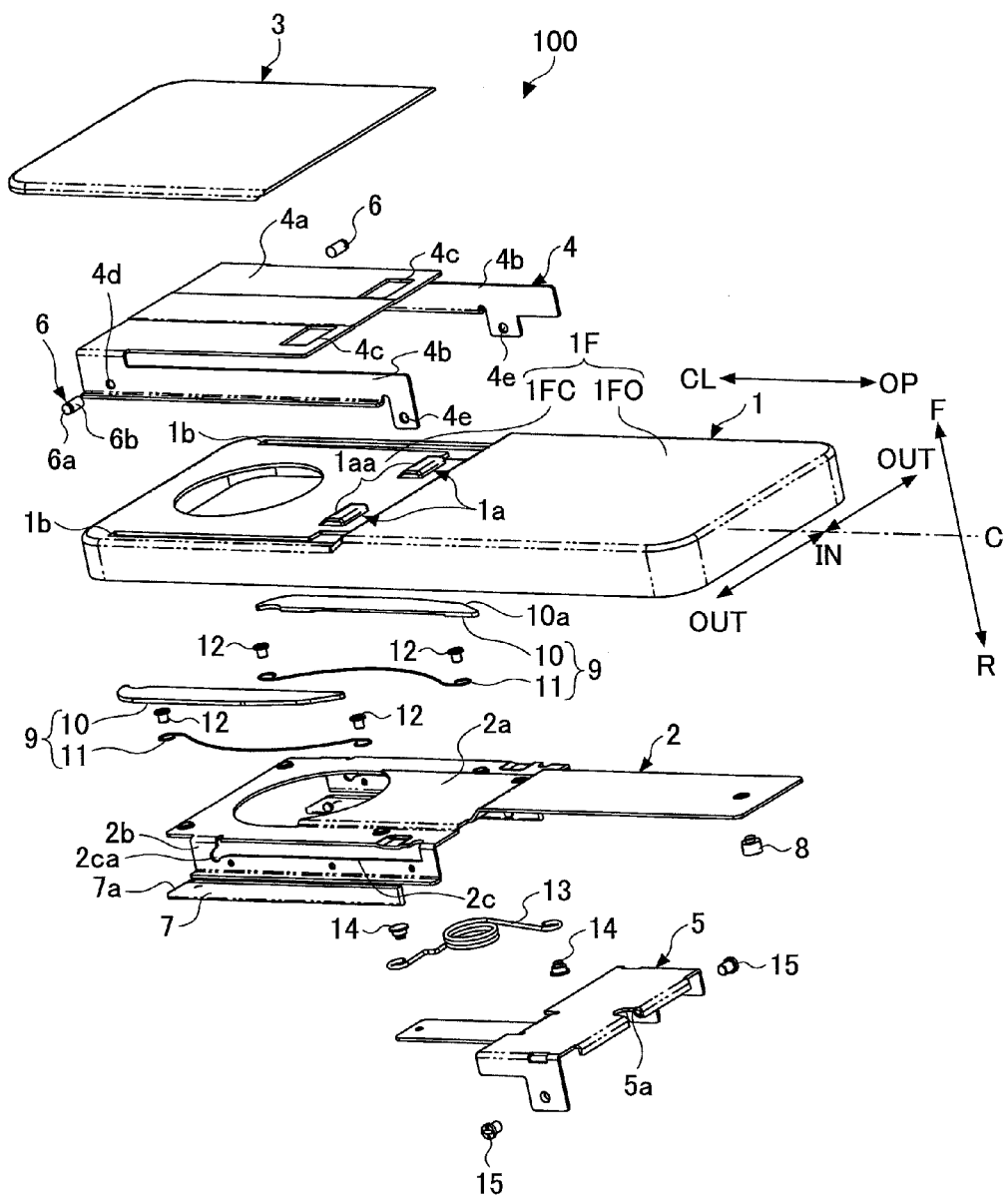
FIG. 1 is a schematic diagram illustrating each of the component elements of a sliding apparatus according to a first embodiment being arranged in a front/rear direction.

As illustrated in FIG. 1, the sliding apparatus 100 of the first embodiment includes: a base frame (substrate) 2 including a base part 2a fixed to a base cover (main body part) 1 and a pair of leg parts 2b that separate from each other in a width direction of the base part 2a; a slide frame (slide plate) 4 including a flat part 4a fixed to a slide cover (sub body part) 3 and a pair of arm parts 4b that are slidable between a closed position and an open position in an opening/closing direction relative to the leg parts 2b; and a sub-slide frame (additional slide plate) fixed to the slide frame 4.

The base cover 1 and the slide cover 3 are formed by, for example, aluminum press molding. The base frame 2, the slide frame 4, and the sub-slide frame 5 are formed by, for example, performing a pressing process or a bending process on a plate made of metal such as SUS. A thin plate-like cushion (see cushion 4f of FIG. 5 (c)) is provided on a rear surface of the slide frame 4.

In addition, the flat part 4a is positioned on the front side and the arm parts 4b are positioned on the rear side in the front/rear direction relative to a front surface part 1F of the base cover 1. The arm parts 4b extend in the rear direction from a position offset from a closing direction side end part of the flat part 4a.

The arm part 4b includes a slide portion perpendicular to the width direction and a support portion that is further bent from the slide portion and perpendicular to the front/rear direction. Slits are provided between both sides of the width direction of the flat part 4a and the arm parts 4b in order to prevent interference with the moving of the base cover 1 in the opening direction. The flat part 4a includes opening direction side parts having a pair of quadrate holes 4c (hole part) symmetrically arranged on the left and right relative to the center line C.

The front surface part 1F includes a sloped surface part 1a having a sloped surface 1aa that is engaged with the hole part 4c and sloped toward a rear direction side in the closing direction in the closed position. The pair of arm parts 4b includes a release prevention head part 6a positioned in the outer side of the width direction and a projecting part 6b projecting in the inner side of the width direction. The release prevention head part 6a and the projecting part 6b have a configuration in which a column-like slide pin 6 (e.g., formed of a synthetic resin) is fixed to a corresponding hole part 4d by caulking.

The leg part 2b has a slide block (slide guiding part) 7 bonded to a front surface of a support part of the arm part 4b by an appropriate method (e.g., insert molding, thermal welding) in which the slide block 7 has a contacting surface contacting a rear direction side of the projecting part 6b, extends in the opening/closing direction, and is formed of, for example, a synthetic resin. Further, the leg part 2b has a slide part including a detachment prevention groove 2c for allowing the projecting part 6b to be inserted therethrough with play in the front/rear direction, preventing the projecting part 6b from being displaced mainly in the front direction, and extending in the opening/closing direction for preventing detachment.

The contacting surface of the slide guiding part 7 includes a closing direction end having a sloped part 7a sloped in the rear direction. The contacting surface of the slide guiding part 7 other than the sloped part 7a constitute a flat surface that is orthogonal to the front/rear direction. The detachment prevention groove 2c has a closing direction end part includes a restricting part 2ca having a recessed shape processed in a direction oriented toward the closing direction and the rear direction and restricting the movement of the projecting part 6b and a closing direction end of the slide frame 4 in the front/rear direction only during an initial stage.

In the first embodiment, the angle of the sloped surface 1aa of the sloped surface part 1a relative to the opening/closing direction is set to be greater than that of the sloped part 7a. It is to be noted that, "angle" refers to an angle formed by each surface itself relative to the opening/closing direction and does not refer to an angle formed by a normal line of each surface relative to the opening/closing direction.

In a space between an opening direction end of the sub-slide frame 5 and a rear surface part of the base part 2a of the base frame 2 in the closed position, an opening direction end of the flat part 4a moves in the front direction when a pressing force exerted to a closing direction end of the slide cover 3 in the rear direction and the opening direction in a case where the projecting part 6b being restricted by the restricting part 2ca serves as a center fulcrum. The amount of the movement is set to become equivalent to a step difference of the front surface part 1F in the front/rear direction.

As illustrated in FIG. 1, in the closed position, the front surface part 1F of the base cover 1 includes a closing direction side part 1FC that installs the slide cover 3 and the flat part 4a of the slide frame 4 and an opening direction side part FO that is positioned toward the opening direction side than the closing direction side part 1FC. The step difference amount of the front surface part 1F is an offset amount between the closing direction side part 1FC and the opening direction side part 1FO in the opening/closing direction and is substantially equivalent to the total thickness of the slide cover 3 and the flat part 4a of the slide frame 4 in the front/rear direction.

Further, in the sliding apparatus 100 according to the first embodiment, a semi-circular shaped recess part 5a, which is recessed in the closing direction, is provided in an opening direction end part of the sub-slide frame 5. A lock pin (projecting part) 8, which is engages with the recess part 5a in the open position, is provided in the base part 2a in a manner projecting in the rear direction.

Further, in the sliding apparatus 100 according to the first embodiment, the closing direction side part 1FC of the front surface part 1F of the base cover 1 includes a pair of slits (insertion grooves) 1b that have the arm part 4b inserted therethrough and separated from each other in the width direction. An opening direction side end part of the slit 1b has a wide shape for inserting the release prevention head part 6a and the projecting part 6b of the arm part 4b therethrough. Further, there is included a slit cover 9 that covers the slit 1b from the rear direction during a position other than the closed position.

The slit cover 9 included in the sliding apparatus 100 according to the first embodiment includes a cover plate 10 and a cover spring (urging part) 11 that exerts force to the cover plate 10 toward the outer side in the width direction. An opening direction end part of the cover plate 10 includes a two step sloped surface 10a that contacts a closing direction end of the arm part 4b and is sloped in two steps in the opening/closing direction.

Figure 7:
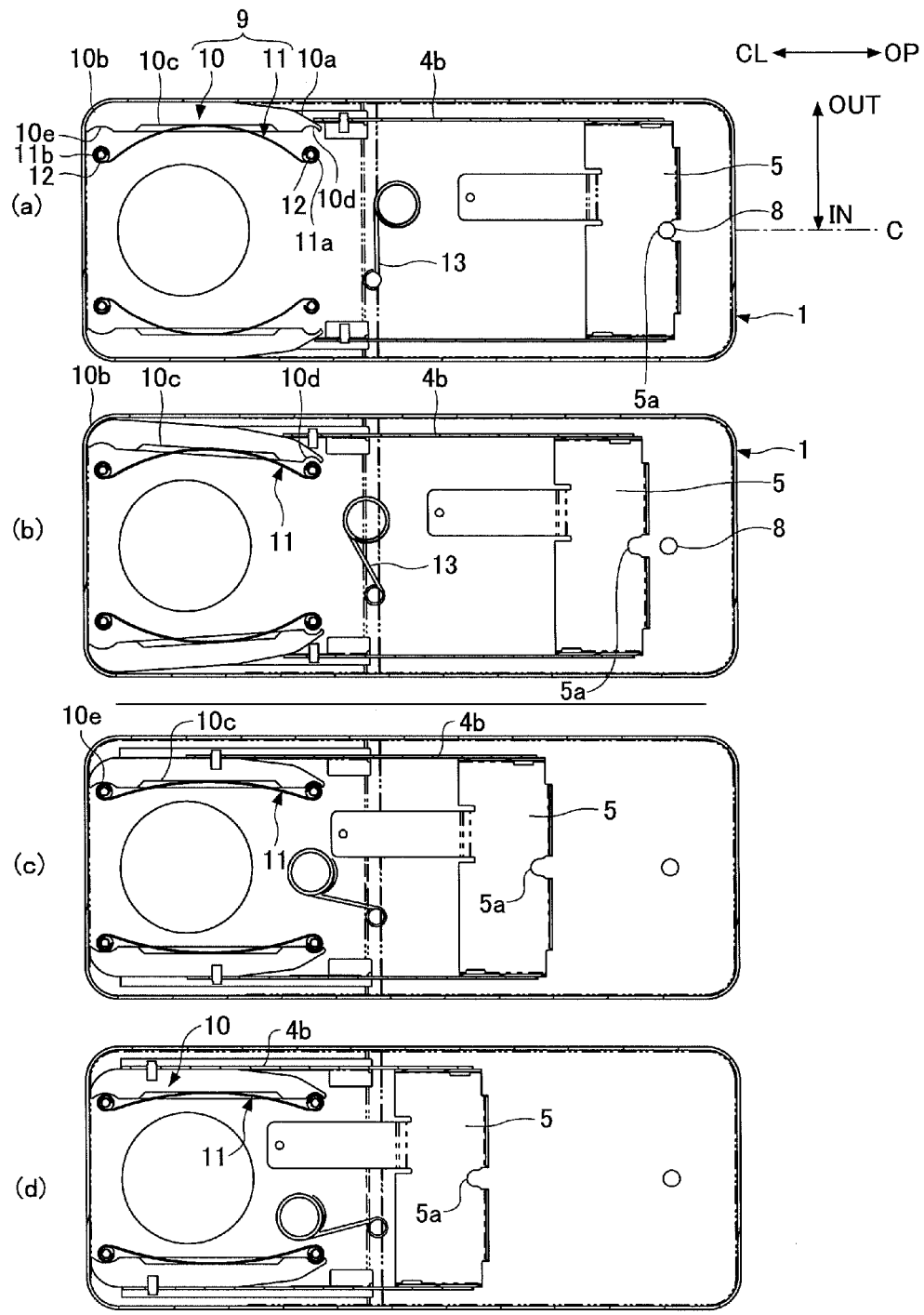
FIG. 7 is a schematic diagram illustrating component elements contributing to a covering movement of the sliding apparatus according to the first embodiment view from the front/rear direction.

As illustrated in FIG. 7, an opening direction sloped surface of the two-step sloped surface 10a is set having an angle greater than that of a closing direction slope surface in the opening/closing direction. It is to be noted that, "angle" refers to an angle formed by each surface itself relative to the opening/closing direction and does not refer to an angle formed by a normal line of each surface relative to the opening/closing direction.

The cover plate 10 extends in the opening/closing direction, has a flat shape orthogonal to the front/rear direction, and includes a flat-shaped closing direction end part at an outer side in the width direction having a corresponding contour shape part 10b corresponding to the inner contour of the base cover 1. Because a closing direction end part of the base cover 1 has an R letter shape having an angle of 90 degrees, the corresponding contour shape part 10b also an R letter shape.

The cover spring 11 is formed of a so-called wire spring in which one of its two ends is a curled opening direction fulcrum 11a and the other is similarly a curled closing direction fulcrum 11b in a case where the cover spring 11 is fixed to a front surface of an outer part in the width direction of a large lens hole part provided in the base part 2a of the base frame 2. The cover spring 11 has a curved shape extending in the opening/closing direction and projecting outward in the width direction.

The flat shape of the cover plate 10A has an intermediate part in the opening/closing direction and the inner side in the width direction that includes an opening direction fulcrum installing part 10d having a partially arcuate shape for installing the opening direction fulcrum 11a of the cover spring 11.

Likewise, the closing end part of the inner side in the width direction of the flat shaped cover plate 10 includes a closing direction fulcrum installing part 10e having a partially arcuate shape for installing the closing direction fulcrum 11b of the cover spring 11.

Figure 2:
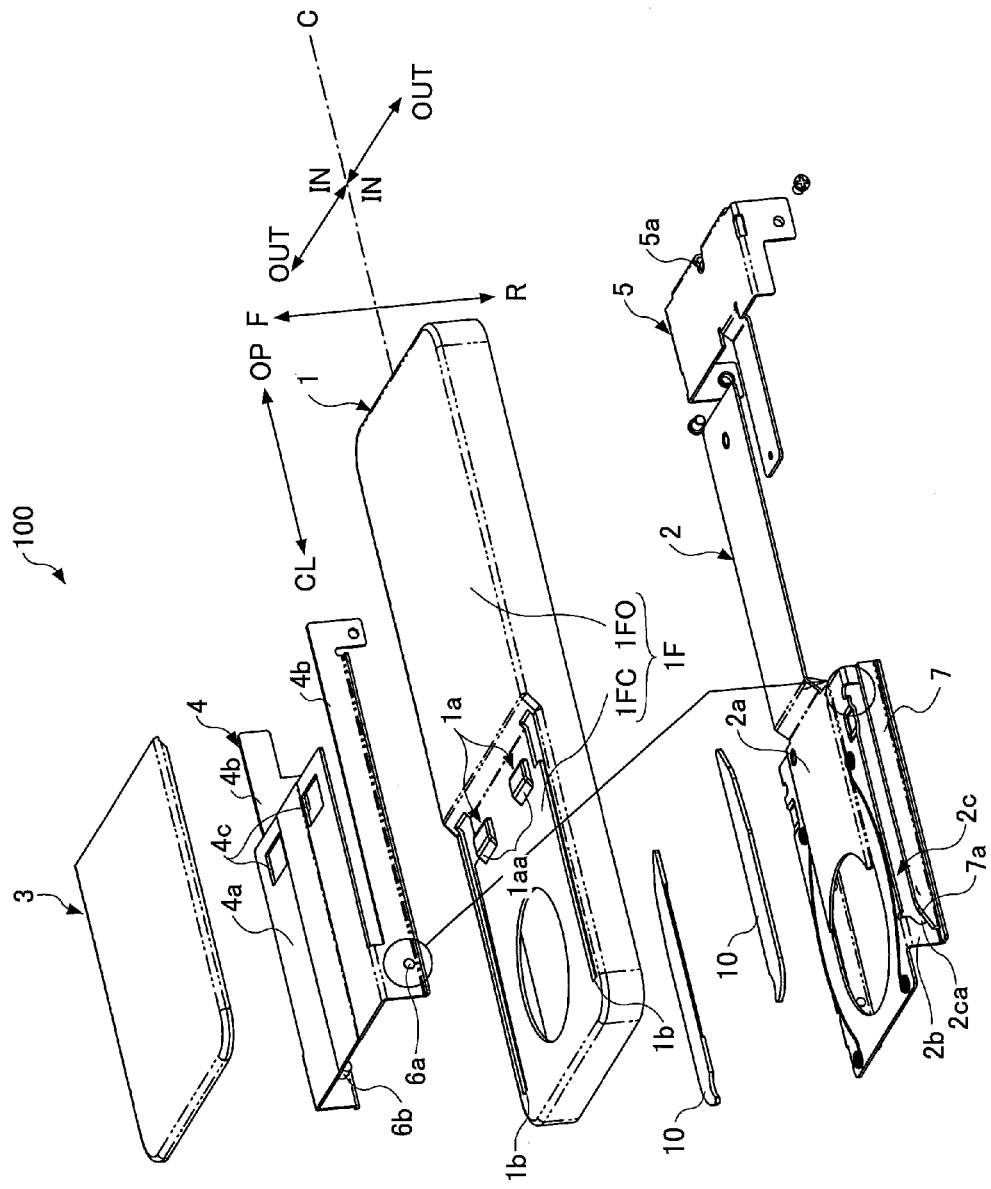
FIG. 2 is a schematic diagram illustrating an example of an assembly of each of the component elements of the sliding apparatus according to the first embodiment.

As illustrated in FIG. 2, the slide pin 6 is attached by caulking to the hole part 4d of the slide pin 6 provided in the closing direction side part of the pair of left/right arm parts 4b of the slide frame 4, and the slide cover 3 is attached by caulking to the flat part 4a of the slide frame 4, to thereby constitute a sub-ASSY (sub-assembly).

The pair of arm parts 4b of the sub-assembly is inserted to a pair of slits 1b of the base cover 1 from the front direction, and the projection part 6b, which is inserted to the detachment prevention groove 2c of the base frame 2 (having the cover plate 10 placed at an outer side of the cover spring 11 fixed to the base part 2a), contacts a contacting surface of the slide block 7.

Further, the base frame 2 is connected to one end of a spring 13 (which provides an appropriate operation reactive force and a supporting force in correspondence with an opening/closing operation) by way of a spring pin 14. A closing direction projecting part of the sub-slide frame 5 is connected to the other end of the spring 13 by way of the spring pin 14. The sub-slide frame 5 is engaged with a hole part 4e of an opening closing end of the arm part 4b by way of a screw 15. The spring 13 is, for example, a coil spring.

Figure 3:
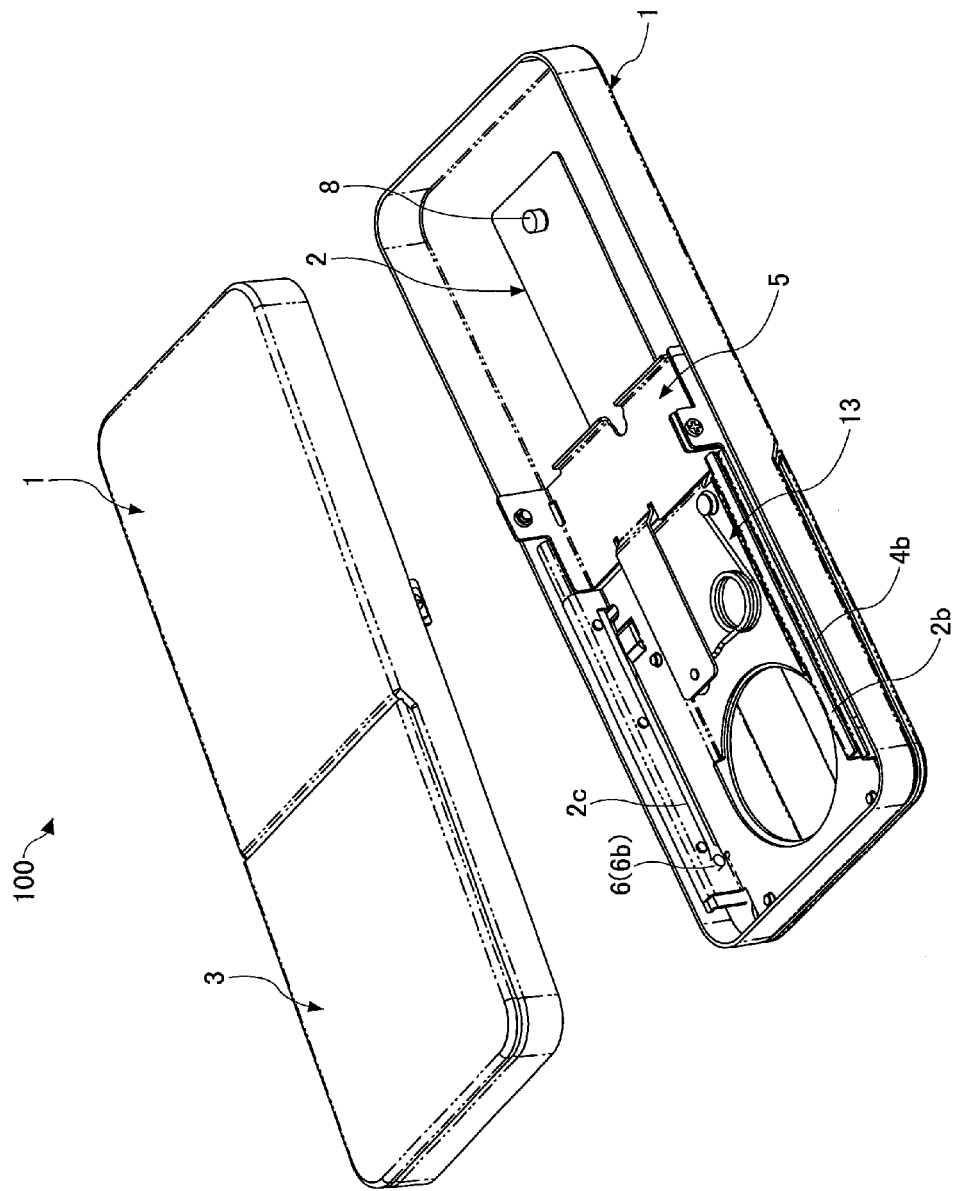
FIG. 3 is a schematic diagram illustrating the sliding apparatus according to the first embodiment after being assembly viewed from the front/rear direction in a case where a bottom cover is removed.

The cover plate 10 is sandwiched between a rear surface part of an outer part in a width direction of a lens hole part of the base cover 1 and a front surface of an outer part in a width direction of a lens hole part of the base frame 2 in a manner being urged outward in the width direction by the cover spring 11 with play. Thereby, the sliding apparatus 10 is assembled as illustrated in FIG. 3.

With the sliding apparatus 100 and the electronic device including the sliding apparatus 100 according to the above-described first embodiment, the following movements can be executed and the following advantageous effects can be attained. These movements are described with reference to FIGS. 4 and 5 (a)-(d).

Figure 4:
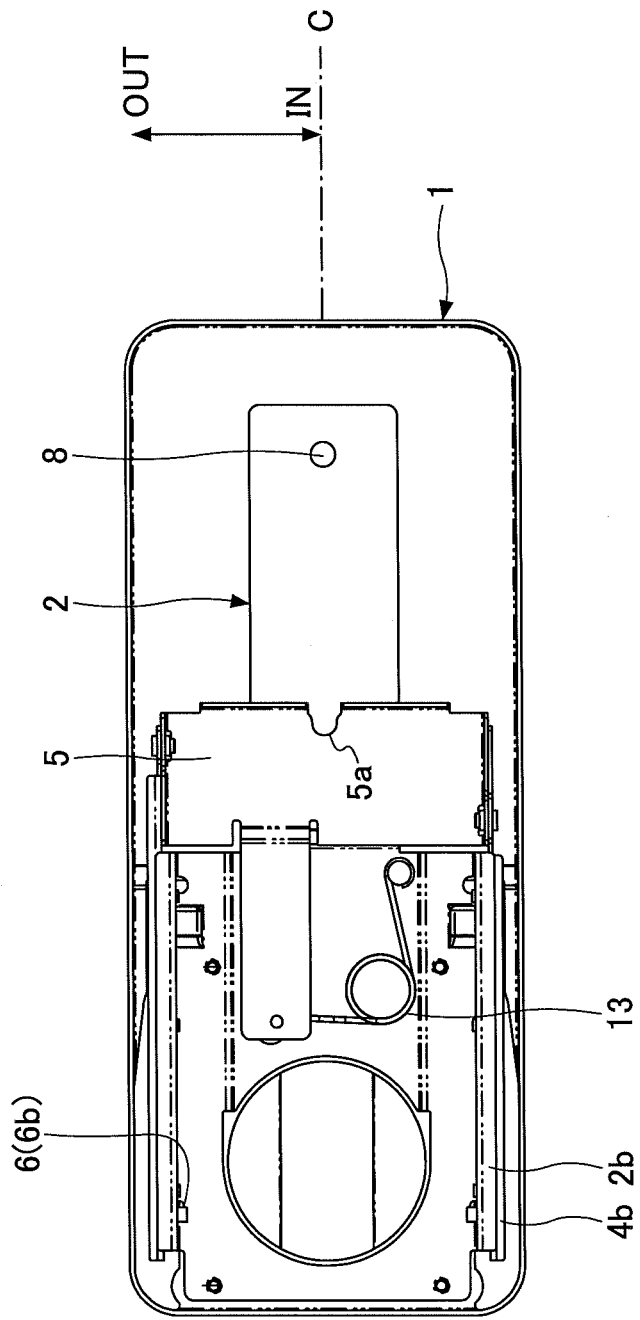
FIG. 4 is a schematic diagram illustrating a closed state of the sliding apparatus according to the first embodiment view from the rear direction in a case where the bottom cover is removed.
Figure 5:
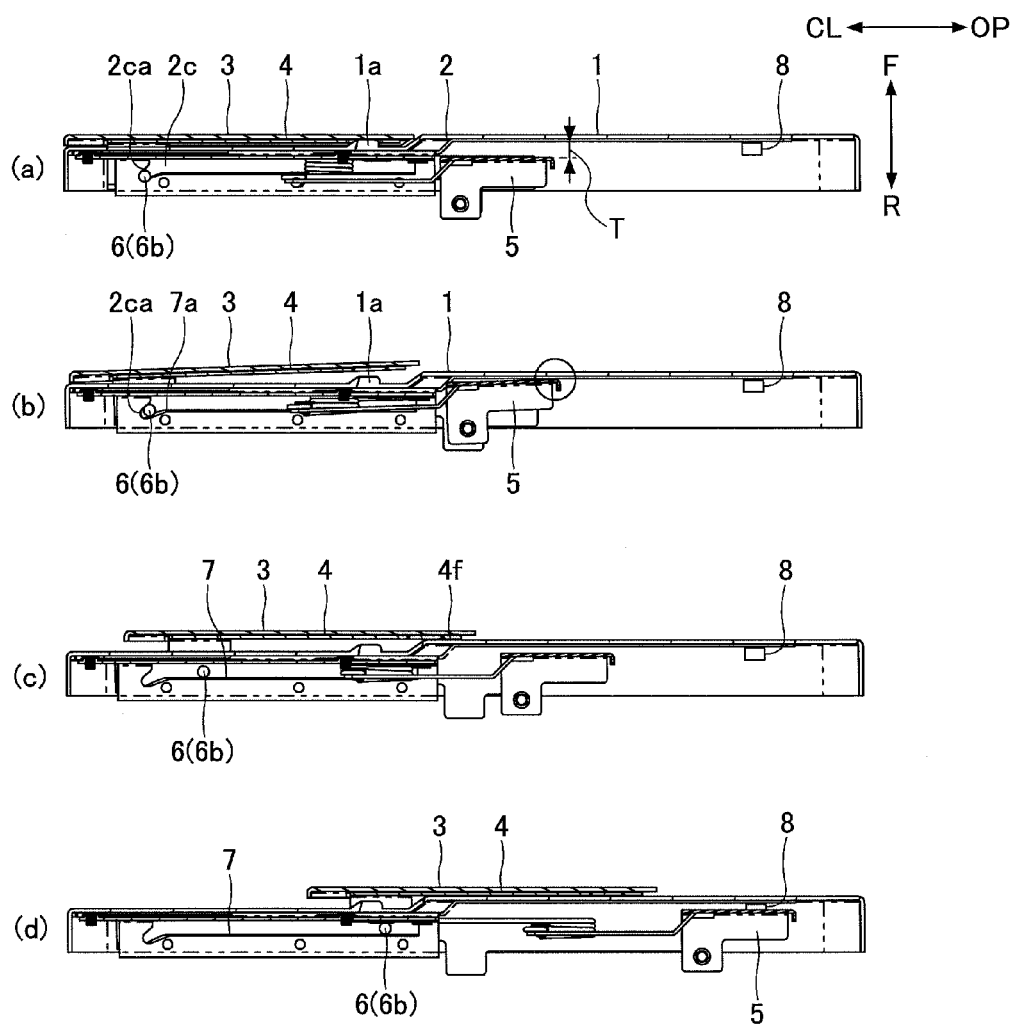
FIG. 5 is a schematic diagram illustrating a sliding movement of the sliding apparatus according to the first embodiment viewed from a width direction relative to a cross section that includes component elements contributing to the sliding movement and is orthogonal to the width direction.

FIG. 4 illustrates a positional relationship of the spring 13, the sub-slide frame 5, the leg part 2b, the arm part 4b in a closed position when viewed from a rear direction. FIG. 5 illustrates the relative positional relationship between the slide cover 3, the base cover 1 of the slide frame 4, and the base frame 2 within a surface orthogonal to the width direction of FIG. 4 for each step of a sliding operation, and also illustrates an engaging configuration between the projecting part 6b and the restricting part 2ca and a contacting configuration between the projecting part 6b and the slide block 7 when viewed from the center line C to an outward direction OUT in the width direction of FIG. 4 for each step of the sliding operation.

As illustrated in FIG. 5(A), a space T between an opening direction end of the sub-slide frame 5 (in the closed position) and a rear surface part of the base part 2a of the base frame 2 in the front/rear direction is set, so that the amount of movement in which the opening direction end of the flat part 4a moves becomes equivalent to the amount of step difference of the front surface part 1F in the front/rear direction in a case where the projecting part 6b being restricted by the restricting part 2ca serves as a center fulcrum (as illustrated in FIG. 5(b)) in a case where a pressing force is exerted to the closing direction end of the slide cover 3 in the rear direction and the opening direction during an initial stage.

In FIG. 5(a), an opening operation for moving the slide cover 3 from the closed position to the open position is started when a pressing force is exerted to the closing direction end part of the slide cover 3 in the rear direction and the opening direction.

In this opening operation (initial stage of sliding operation), the restricting part 2ca restricts the projecting part 6b and the closing direction end of the slide frame 4 in the front/rear direction as illustrated in FIG. 5(b). In correspondence with the restricting movement in the front/rear direction, an inner rim part (in the closing direction) of the hole part 4c moves in the opening direction and contacts the sloped surface 1aa, and a lifting force is generated toward an opening direction end of the slide frame 4 along with the contact between the inner rim part and the sloped surface 1aa in a case where the projecting part 6 serves as a fulcrum. Accordingly, the open direction end of the slide frame 4 moves in the front direction together with the slide cover 3. Thereby, a wheelie movement occurs as illustrated in FIG. 5(b).

In the first embodiment, the slope angle of the sloped surface 1aa relative to the opening/closing direction is made to greater than and different from the slope angle of the sloped part 7a relative to the opening/closing direction, so that the amount of movement of the opening direction end of the slide frame 4 in the front direction during the wheelie movement is appropriately adjusted. It is, however, to be noted that this greater than/less than relationship can be adaptively changed in correspondence with a desired amount of movement. Thus, this relationship may be equal or reversed.

The amount of movement of the opening direction end part of the slide frame 4 in the front direction during the wheelie movement is restricted by interference between an opening direction end of the sub-slide frame 5 (that moves in the front direction together with the opening direction end part of the slide frame 4) and a rear surface part of the base part 2a of the base frame 2 as illustrated in FIG. 5(b). Thereby, a movement of restricting the amount of movement is performed.

In a case where a pressing force (for continuing the opening operation) is exerted to the closing direction end part of the slide cover 3 after the movement of restricting the amount of movement is performed, the projecting part 6b is released from being restricted in the front/rear direction by the restricting part 2ca. The projecting part 6b moves in the opening direction while contacting the sloped part 7a of the slide block 7. The closing direction end of the slide frame 4 moves in the front direction as the projecting part 6b moves in the opening direction, and runs over the sloped part 7a. Thereby, a tail lifting movement is performed.

After the tail lifting movement is performed, the slide frame 4 and the slide cover 3 move in parallel relative to the base frame 2 in the opening direction until reaching the open position (as illustrated in FIG. 5(d)) in correspondence with the contact between the projecting part 6b and a contacting part of the slide block 7 (other than the sloped part 7a) that is parallel to the base part 2a and the contact between the cushion 4f of the rear surface of the slide frame 4 and an opening direction part 1FO of the front surface part 1F of the base cover 1 (as illustrated in FIG. 5(b)). Thereby, a parallel movement is performed.

Figure 6:
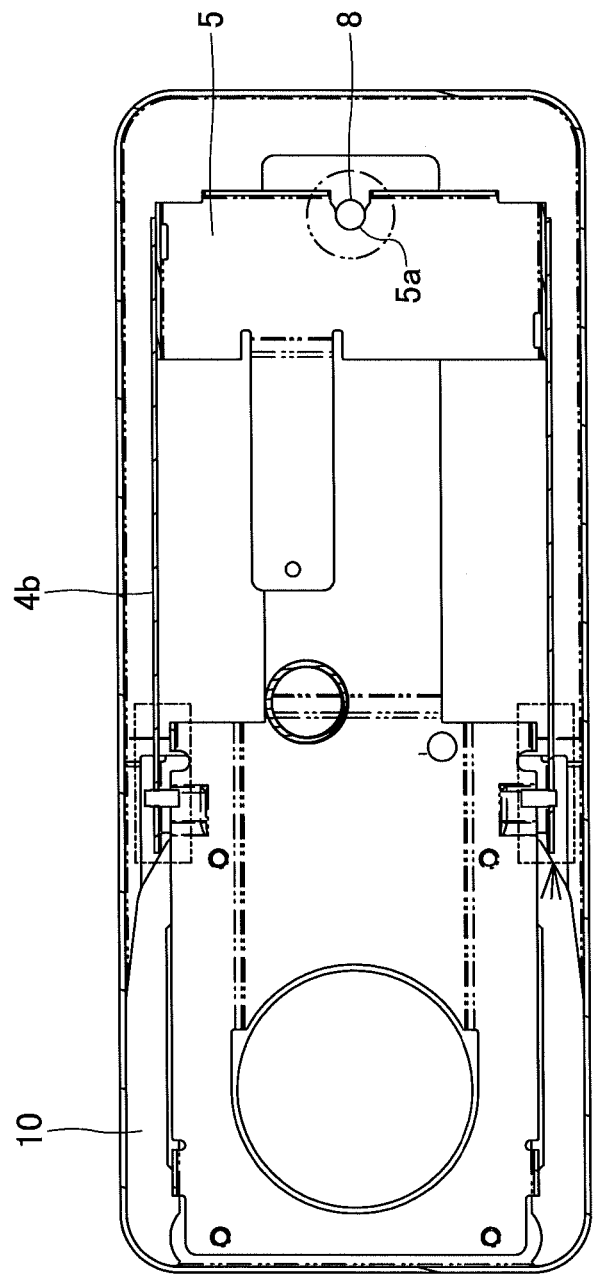
FIG. 6 is a schematic diagram illustrating an open stage of the sliding apparatus according to the first embodiment viewed from the rear direction in a case where the bottom cover is removed.

As illustrated in FIG. 6, in a case where an opening position is selected after the performing of the parallel movement, a lock pin 8 is engaged with the recess part 5a of the sub-slide frame 5. In the open position, movement of the slide frame 4 relative to the base frame 2 (namely, relative rotation having the opening/closing direction at the center, relative movement in the width direction) tends to occur in a case where the amount in which the arm part 4b and the leg part 2b overlap in the opening/closing direction (encompassing amount) becomes small. However, owing to the configuration of engaging the recess part 5a and the lock pin 8 in the open position, the relative rotation and the relative movement can be prevented. Thereby, the so-called generation of shaking can be prevented.

With the sliding apparatus according to the first embodiment, an operation reactive force relative to pressing force can be reduced because only the opening direction end of the slide frame 4 is moved in the front direction during the wheelie movement of the initial stage. Further, an operation reactive force relative to pressing force can also be reduced because only the closing end slide frame 4 is moved in the front direction during the tail lifting movement. That is, operability can be improved by enhancing the operating feel during each movement.

In addition, for example, the slide pin 6 of the arm part 4b, the slide block 7 of the leg part 2b, the detachment prevention groove 2c, and the restricting part 2ca, which contribute to each of the above-described movement and constitute main components, can be concentrated on the outer side in the width direction by inserting the arm part 4b to the slit 1b, and only the slope surface part 1a of the base cover 1 and the hole part 4c of the slide frame 4 can be arranged on the inner side in width direction.

Accordingly, when an electronic device using the sliding apparatus 100 includes a photographing lens in a case where there is a condition to increase of lens diameter, designing and manufacturing can be achieved without encountering restrictions pertaining to designing or mounting of the main components required for the opening movement of the slide cover 3. In addition, the amount of stroke relative to the base cover 1 of the slide cover 3 can be increased.

Next, an example of a covering movement of the slit cover 9 of the sliding apparatus 100 according to the first embodiment during a closing movement (opposite to the above-described opening movement) is described with reference to FIG. 7. In the open position illustrated in FIG. 7(a), the arm part 4b is displaced to the maximum in the opening direction, the closing direction end of the arm part 4b contacts only the opening direction side sloped surface of the two-step sloped surface 10a of the cover plate 10, and no pressing force is exerted to the opening direction side sloped surface in the closing direction.

In a case where a pressing force is exerted to the opening direction end of the slide cover 3 in the closing direction, the closing direction end of the arm part 4b causes a pressing force to be exerted to the opening direction side sloped surface of the two-step sloped surface 10a in the closing direction, the opening direction end of the cover plate 10 moves toward the inner side of the width direction against an urging force applied to the cover spring 11 by way of the curved installing part 10c in a case where the R-shaped corresponding inner contour shape part 10b of the closing direction serves as a fulcrum, and the closing direction end of the arm part 4b contacts the closing direction side sloped surface of the two-step sloped surface 10a, as illustrated in FIG. 7(b).

Further, as illustrated in FIG. 7(c) in a case where a pressing force is exerted to the opening direction end of the slide cover 3 in the closing direction, the closing direction end of the arm part 4b pushes the closing direction side sloped surface of the two-step sloped surface 10a toward the inner side of the width direction, causes the opening direction side fulcrum installing part 10d of the cover plate 10 to contact the opening direction side fulcrum 11a of the cover spring 11, and causes the closing direction side fulcrum installing part 10e to contact the closing direction side fulcrum 11b. Thereby, the surface of the inner side in the width direction) of the arm part 4b contacts more to the closing direction side surface of the cover plate 10 than to the two-step sloped surface 10a.

In a case where a pressing force is further exerted from the state illustrated in FIG. 7(c) in the closing direction, the closing direction end of the arm part 4b moves to the closed position while the surface of the inner side of the width direction of the closing direction end part of the arm part 4b contacts more to the closing direction side surface of the cover plate 10 than the two-step sloped surface 10a. Accordingly, the cover plate 10 constantly covers and hides a part of the slit 1b positioned more toward the closing direction side than the closing direction end of the arm part 4b. Thereby, design property can be improved along with preventing foreign particles and the like from entering.

Further, in the sliding apparatus 100 according to the first embodiment, the cover plate 10 and the cover spring 11 can be efficiently arranged in a small narrow area in the front/rear direction. Further, the cover plate 10 and the cover spring 11 (which constitute the slit cover 9) are formed to effectively utilize the shapes of the base frame 2 and the base cover 1. Thereby, a covering movement concurrent with an opening/closing operation can be performed without requiring a sophisticated mechanism.

It is to be noted that the present invention is not limited to the above-described first embodiment, but various variations and modifications may be made without departing from the scope of the present invention.

For example, although the sub-body part of the first embodiment is described as being a slide cover, it may also include, for example, a display, s touch panel, or a microphone. That is, the electronic device to which the sliding apparatus of the present invention is applied is not limited to an imaging device, but may also be applied to various devices such as a portable telephone or a portable terminal.

In the above-described first embodiment, the sliding apparatus 100 is described as being mainly used for an electronic device having a lens with a large outer diameter. The present invention may also be applied to an electronic device having a lens with a small outer diameter where there is no need to arrange components in the outer side of the width direction for performing the wheelie movement or the tail lifting movement. Next, a second embodiment of the present invention is described.

Figure 8:
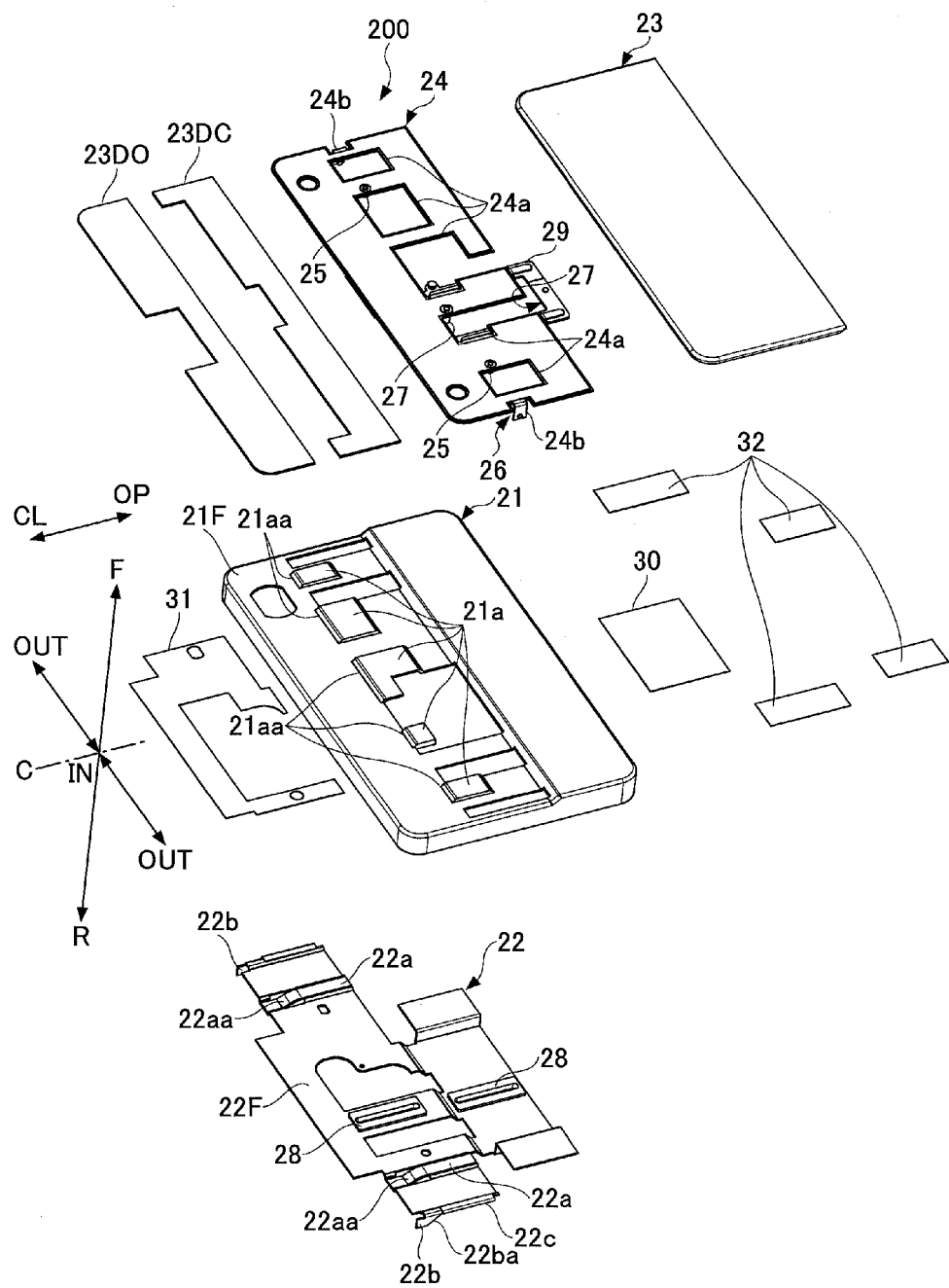
FIG. 8 is a schematic diagram illustrating each of the component elements of a sliding apparatus according to a second embodiment being arranged in a front/rear direction.

In FIG. 8 (which is referred for describing the second embodiment of the present invention), "C" indicates a center line of the width direction, "OUT" indicates an outer side separating from the center line C in the width direction, "IN" indicates an inner side approaching the center line C in the width direction. "F" indicates the front direction of the front/rear direction and represents a direction from a main body part 21 to a sub-body part 23 according to the second embodiment. "R" indicates the rear direction. "CL" indicates the closing direction of the opening/closing direction, and "OP" indicates the opening direction.

Similar to FIG. 1, in a case of viewing from the opening direction OP where the front direction F is oriented upward, the outer side OUT of the width direction of the area on the right side of the width direction relative to the center line CL corresponds to a right side, the inner side IN corresponds to a left side. In the area on the left side of the width direction relative to the center line CL, "OUT" corresponds to the left side, and "IN" corresponds to the right side.

As illustrated in FIG. 8, a sliding apparatus 200 of the second embodiment includes a base frame (substrate) 22 that is fixed to the base cover (main body part) 21 and a slide frame (slide plate) 24 that is fixed to a slide cover (sub-body part) 23 and is slidable between an open position and a closed position in the opening/closing direction.

Further, the base cover 21 and the slide cover 23 are molded by, for example, aluminum press forming. The base frame 22 and the slide frame 24 are formed by performing an appropriate process (e.g., pressing process, bending process) on a plate made of metal (e.g., SUS). The base cover 21 includes a window part (which is a combination of a pair of partially arcuate shapes and a pair of straight lines) for a lens (not illustrated) and has thin plate-like cushions 23DO, 23DC bonded together on a rear side of the slide frame 24 by using a suitable means.

The slide frame 24 has quadrate hole parts 24a (in this embodiment, five) arranged in its opening/closing direction and its center part relative to the width direction. A front surface part 21F of the base cover 21 has a sloped surface part 21a including a sloped surface 21aa that is engaged with the hole part 24a in the closed position and is sloped toward the rear direction side relative to the closing direction.

In the sliding apparatus 200 according to the second embodiment, a flat part 22F of the base frame 22, which includes two slide guiding parts 22a that guide the slide frame 24 in its sliding direction, has a restricting part that restricts the front/rear direction movement of the closing direction end of the slide frame 24 during an initial stage where the slide frame 24 slides from the closed position to the open position, and a sloped part 22aa that is formed on the closed direction end part of the slide guiding part 22a and sloped in the rear direction.

The flat part 22F of the base frame 22, in addition to having two slide guiding parts and sloped parts 22aa in the width direction, includes a projecting part 22b that projects from a width direction outer side end of the flat part 22F in the rear direction and a sloped side part 22ba that is sloped in the front direction relative to the opening direction.

Further, the slide frame 24 has: a main slide pin 25 (rear projecting part) being provided in its inner side part relative to the width direction, projecting in the rear direction, and contacting the slide guiding part 22a and the sloped part 22aa; a projecting part 24b being provided in its outer side part relative to the width direction and projecting in the rear direction; and a sub-slide pin (inner projecting part) 26 extending from the projecting part 24b to the inner side part relative to the width direction and contacting the sloped side part 22ba. The sloped side part 22ba, which contacts the sub-slide pin 26, constitutes the restricting part. The opening direction side part (which does not include the projecting part 24) of the outer side end of the width direction of the flat part 22F has a parallel part 22c that is parallel to the opening/closing direction.

Further, the slide frame 24 includes a pair of guide pins (rear projecting parts) 27 being arranged in the opening/closing direction and projecting in the rear direction. The base frame 22 includes guides (restricting parts) 28 that restrict the amount of movement of each of the pair of guide pins 27 in the opening/closing direction and in the width direction.

The guide 28 is formed of a resin including an elongated hole part having a long narrow hollow oval shape for sandwiching the guide pin 27 in the width direction and restricting the amount of movement of the guide pin 27 in the opening/closing direction. The resin guide 28 is fixed to the elongated hole part formed in the base frame 22 in correspondence with the guide 28 by using insert molding or by thermal compression bonding.

In addition, the slide frame 24 includes a holder (holding part) 29 for holding one of the pair of guide pins 27 positioned toward the opening direction, and a sliding tape (friction reduction part) 30 provided on the rear side of the base cover 21 for reducing the friction of the part on which the rear surface of the base cover 21 slides. There is also included a sliding tape (not illustrated) 22F that is parallel to the pair of parallel parts 22c in the width direction.

In FIG. 8, "31" and "32" indicate a double-sided tapes. The double-sided tape 31 adheres a rear surface of the base cover 21 and a front surface of the flat part 22F of the base frame 22. The double-sided tape 32 adheres a rear surface of the slide cover 23 and a front surface of the slide frame 24. The slide cover 23 and the slide frame 24 constitute an ASSY (assembly) on the front side by bonding with each other and are arranged in the front/rear direction relative to the base frame 22 as illustrated in FIG. 9.

Figure 9:
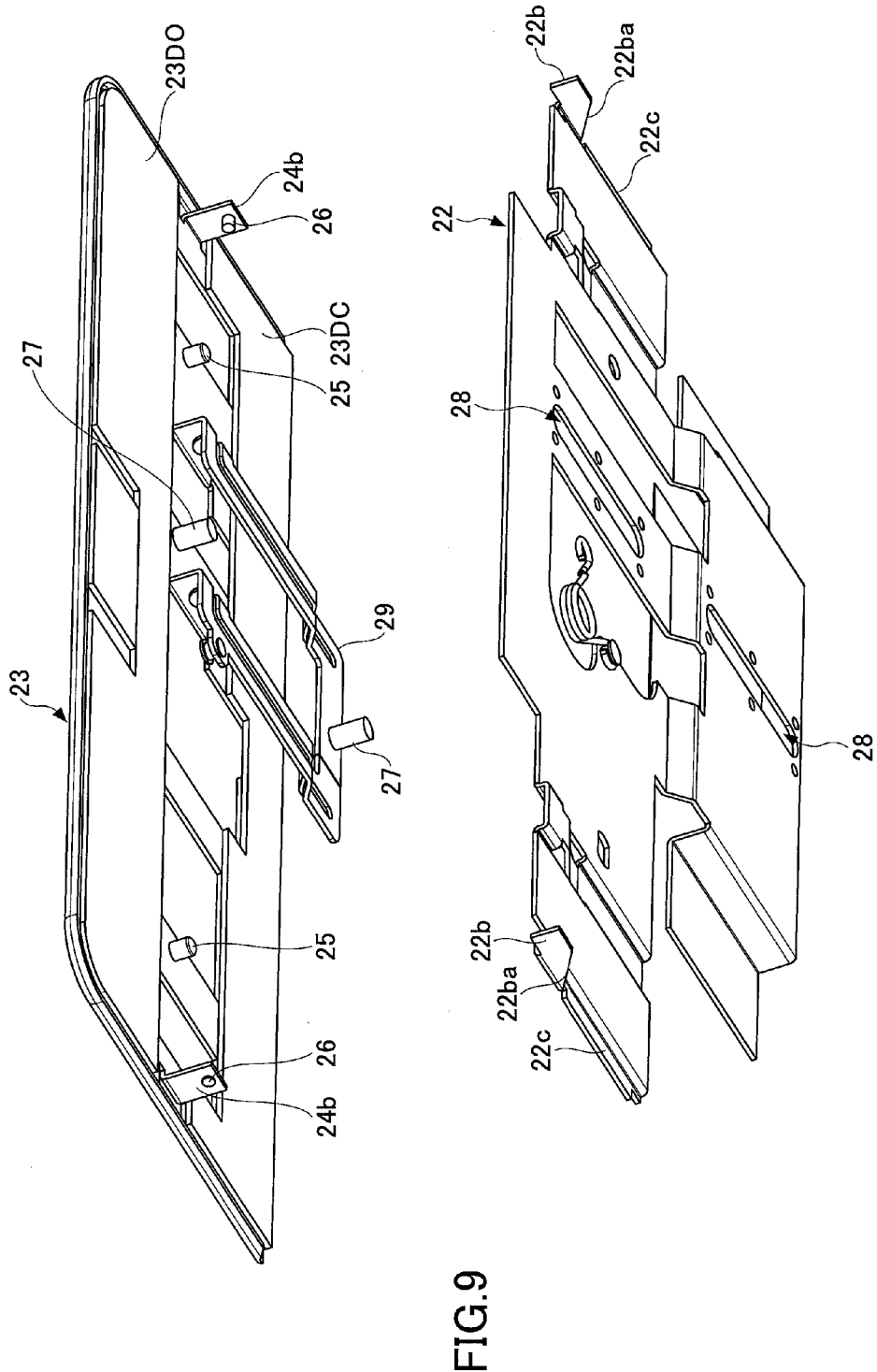
FIG. 9 is a schematic diagram illustrating a positional relationship between component elements contributing to a sliding movement of the sliding apparatus according to the second embodiment viewed from a rear direction and a closing direction.

As illustrated in FIG. 9, the ASSY of the front side includes: the pair of main slide pins 25 being arranged in the width direction and oriented in the rear direction; the sub-slide pin 26; the projecting part 24b; the pair of guide pins 27; and the projecting holder 29.

In correspondence with the configuration (including the ASSY on the front side) projecting in the rear direction, the base cover 21 includes plural slits appropriately extending in the front/rear direction for allowing the projecting configuration to be inserted from the front direction as illustrated in FIG. 8. Similar to the slide pin 6 of the first embodiment, the main slide pin 25, the sub-slide pin 26, and the guide pin 27, which are formed of, for example, a synthetic resin, are fixed to the base frame 22 by using an appropriate means (e.g., caulking).

The main slide pin 25 and the sub-slide pin 26 of the ASSY of the front side, which are in a state inserted to the plural slits of the base cover 21 from the front direction to the rear direction, are contacted with a corresponding slide guiding 22a and the sloped side part 22ba of the base frame 22 from the front direction to the rear direction. Further, the guide pin 27 is inserted in the elongated hole part of the guide 28. Thereby, the sliding apparatus 200 of the second embodiment is formed.

With the sliding apparatus 200 and the electronic device including the sliding apparatus 200 according to the above-described second embodiment, the following movements can be executed and the following advantageous effects can be attained. These movements are described with reference to FIGS. 10 (a)-(d).

Figure 10:
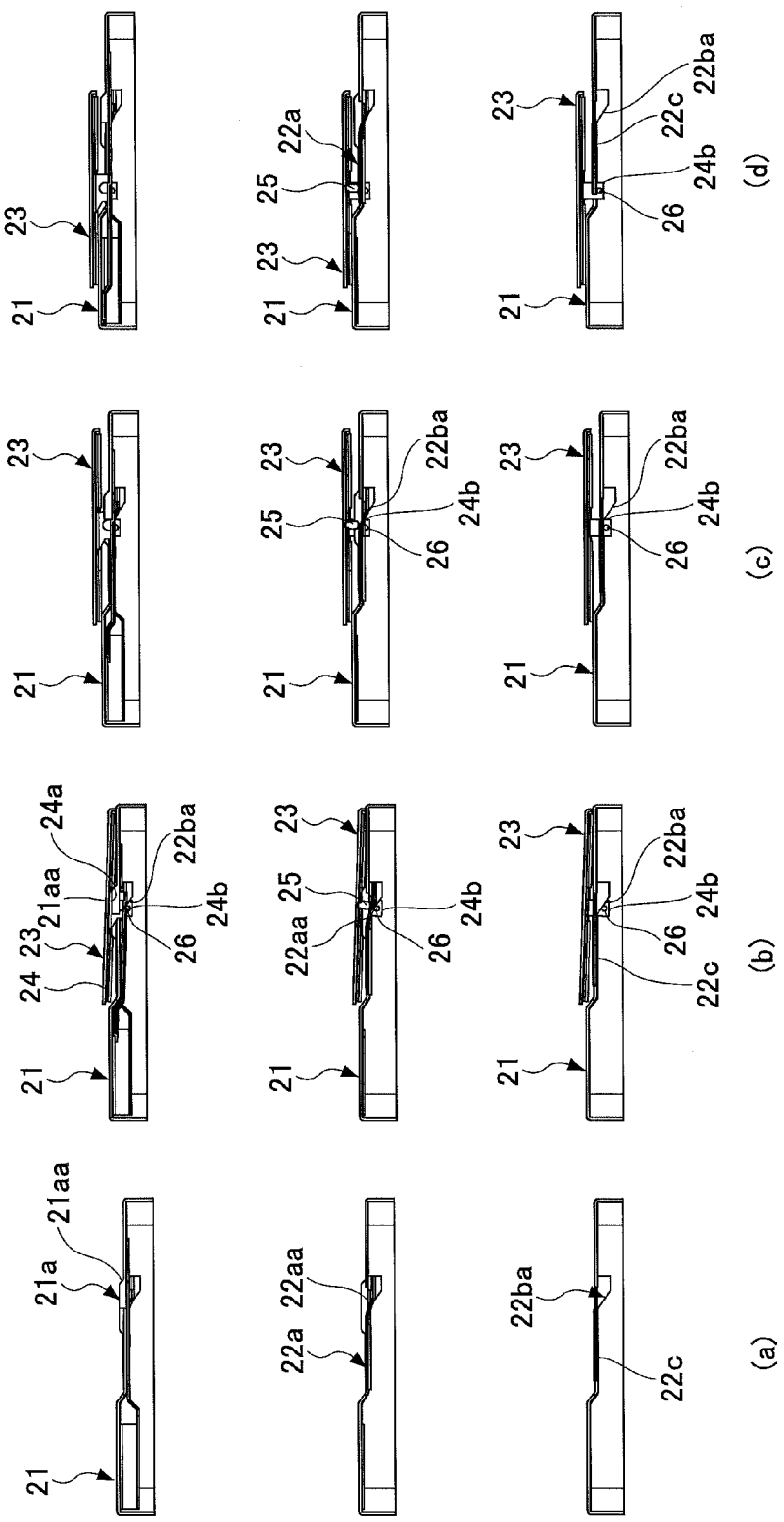
FIG. 10 is a schematic diagram illustrating an interfering relationship between the component elements contributing to the sliding movement of the sliding apparatus according to the second embodiment viewed from a width direction relative to three cross sections that are orthogonal to the width direction.

FIG. 10, which is orthogonal to the width direction, illustrates a first cross section including a contacting state between the sloped side part 22ba and the sub-slide pin 26, a second cross section including a contacting state between the slide guiding part 22a and the main slide pin 25, and a third cross section including a contacting state between the slope surface part 21a and the hole part 24a each of which are viewed from a center line to an outer side in the width direction. In FIG. 10, the first to third cross sections are arranged in order from a bottom side.

FIG. 10(a) illustrates a closed position where the slide cover 23 and the slide frame 24 are omitted, FIG. 10 (b) illustrates an initial stage of sliding from a closed position to an open position, FIG. 10 (c) illustrates a sliding state after the initial stage is finished, and FIG. 10 (d) illustrates an open position. As illustrated in FIG. 10 (a), the sloped side part 22ba is positioned more toward the opening direction than the sloped surface 21aa, and the sloped side part 22ba and the sloped part 22aa are arranged substantially at the same position in the opening/closing direction.

As illustrated in FIG. 10 (b), a pressing force is exerted to the closing direction end part of the slide cover 23 in the rear direction and the opening direction, and an opening operation for moving the slide cover 23 from the closed position to the open position is started. In the initial stage of the slide operation, an inner rim part of the closing direction side of the hole part 24a moves in the opening direction and contacts the sloped surface 21aa, and a lifting force is generated in the opening direction end side of the slide frame 24 in correspondence with the contact between the inner rim part and the sloped surface 21aa.

When the lifting force is generated, the sub-slide pin 26 is pressed by the sloped side part 2ba from the rear direction to the front direction, and the restricting part (=sloped side part 22ba) restricts the sub-slide pin 26 and the closing direction end of the slide frame 24 in the front/rear direction as illustrated in a bottom row of FIG. 10 (b).

When the restriction in the front/rear direction is generated during the initial stage, the lifting force causes the opening direction end of the slide frame 24 to move together with the slide cover 23 in the front direction and execute the wheelie movement in a case where the sub-slide pin 26 serves as a fulcrum. In this case, the closing direction end part of the slide frame 24 contacts the front surface part 21F of the base cover 21 from the front direction to the rear direction. Thereby, a movement amount restricting movement is executed for restricting the amount of movement of the opening direction end part of the slide cover 23 in the front direction.

As illustrated in the bottom row of FIG. 10 (c), when the pressing force is further exerted to the closing direction end part of the slide cover 23 for continuing the opening operation, the sub-slide pin 26 deviates from the sloped side part 22ba in the opening direction, so that the restriction in the front/rear direction is released. In addition, as illustrated in the middle row of FIG. 10(b) and the middle row of FIG. 10 (c), the main slide pin 25 contacts the sloped part 22aa of the slide guiding part 22a, the sub-slide pin 26 moves in the opening direction while contacting the parallel part 22c, and the main slide pin 25 moves in the opening direction and runs over the sloped part 22a. Thereby, the tail lifting movement is executed in which the closing direction end of the slide frame 24 moves in the front direction.

After the tail lifting movement is performed, the slide frame 24 and the slide cover 23 move parallel with the base frame 22 in the opening direction until reaching the open position in accordance with the contact between the main slide pin 25 and the contact part (other than the sloped part 22aa) of the slide guiding part 22a, the contact between the cushions 23DO, 23DC on the rear surface of the slide frame 24 and the front surface part 21F of the base cover 21, and the contact between the sub-slide pin 26 and the parallel part 22c, as illustrated in FIG. 10(d).

With the sliding apparatus according to the second embodiment, an operation reactive force relative to pressing force can be reduced because only the opening direction end of the slide frame 24 is moved in the front direction during the wheelie movement of the initial stage. Further, an operation reactive force relative to pressing force can also be reduced because only the closing end of the slide frame 24 is moved in the front direction during the tail lifting movement. That is, similar to the first embodiment, operability can be improved by enhancing the operation feel during each movement.

In addition, the sliding apparatus according to the second embodiment has the base frame 22 forming a single integrated body with the component corresponding to the slide block 7 of the first embodiment. Therefore, in a case where there is no demand to increase the lens outer diameter, manufacturing becomes easier.

It is to be noted that the present invention is not limited to the above-described embodiments, but various variations and modifications may be made without departing from the scope of the present invention.

The invention claimed is:

1. A sliding apparatus comprising:
   a substrate that is fixed to a main body part;
   a slide plate that is fixed to a sub-body part and is slidable between a closed position and an open position in an opening/closing direction;
   a hole part that is formed in the slide plate;
   a sloped surface part that is formed in the main body part, and is engaged with the hole part in the closed position, and includes a sloped surface being sloped toward a rear direction of the main body part in the opening/closing direction;
   a slide guiding part that guides the slide plate in the opening/closing direction;
   a restricting part that restricts movement of a closing direction end of the slide plate in the front/rear direction of the main body part during an initial stage of sliding the slide plate from the closed position to the open position;
   a sloped part that is formed in a closing direction end part of the slide guiding part and is sloped in the rear direction of the main body part.

2. The sliding apparatus as claimed in claim 1, wherein the substrate includes
   a base part fixed to the main body part, and
   a pair of leg parts separated from each other in a width direction of the base part,
   wherein the slide plate includes
   a flat part fixed to the sub-body part, and
   a pair of arm parts slidable between the open position and the closed position in the opening/closing direction relative to the leg parts,
   the slide plate further comprising an additional slide plate fixed to the slide plate,
   wherein the flat part includes the hole part,
   wherein the pair of arm parts includes a projecting part projecting in the width direction,
   wherein the leg parts include
   the slide guiding part that contacts a rear direction side of the projecting part, and
   a detachment prevention groove that prevents detachment of the projecting part,
   wherein the detachment prevention groove includes the restricting part to restrict movement of the projecting part in the opening/closing direction at a closing direction end part,
   wherein the restricting part is formed at an end of the detachment prevention groove in the opening/closing direction.

3. The sliding apparatus as claimed in claim 2, wherein a space between an opening direction end of the additional slide plate and a rear surface part of the base part in the closed position is set, so that an amount of movement of an opening direction end of the flat part in a front direction of the main body part is equivalent to an amount of step difference of a front surface part of the main body part in the front/rear direction of the main body part where the projecting part is restricted by the restricting part and serves as a fulcrum center when a pressing force is exerted to a closing direction end of the sub-body part in the rear direction of the main body part and the opening direction.

4. The sliding apparatus as claimed in claim 3, wherein the front surface part includes
   a closing direction side part that installs the sub-body part in the closed position, and
   an opening direction side part that is positioned more toward the opening direction than the closing direction side part,
   wherein the amount of step difference is an amount of offset between the closing direction side part and the opening direction side part in the front/rear direction of the main body part.

5. The sliding apparatus as claimed in claim 4, wherein
   a recess part that is recessed in the closing direction is provided in an opening direction end part of the additional slide plate,
   a projecting part that is engaged with the recess part at the opening position is provided in the base part.

6. The sliding apparatus as claimed in claim 1, wherein the main body part includes an insertion groove to which the arm part is inserted,
   the sliding apparatus further comprising
   a slit cover that covers the insertion groove from the rear direction of the main body part at a position other than the closed position.

7. The sliding apparatus as claimed in claim 6, wherein the slit cover includes
   a cover plate and
   an urging part that urges an outer side of the cover plate in the width direction,
   wherein an opening direction end part of the cover plate contacts a closing direction end of the arm part and includes a two-step sloped surface that is sloped in two steps,
   wherein the two-step sloped surface has an opening direction side sloped surface having an angle greater than a closing direction side sloped surface relative to the opening/closing direction.

8. The sliding apparatus as claimed in claim 1, wherein the substrate includes
   a flat part that comprises the slide guiding part and the sloped part, and
   a projecting part that projects from a width direction outer side end of the flat part in the rear direction of the main body part,
   wherein the projecting part includes a sloped side part that is sloped in the front direction relative to the opening direction,
   wherein the slide plate includes
   a rear projecting part that projects toward a width direction inner side part in the rear direction of the main body part and contacts the slide guiding part and the sloped part,
   another projecting part that projects toward the width direction outer side end of the flat part, and
   an inner projecting part that projects from the another projecting part to a width direction inner side and contacts the sloped side part,
   wherein the another projecting part projects in the rear direction of the main body part,
   wherein the sloped side part constitutes the restricting part.

9. The sliding apparatus as claimed in claim 8, wherein the slide plate includes a rear projecting part that projects in the rear direction of the main body part,
   wherein the substrate includes a restricting part that restricts an amount of movement of the rear projecting part in the opening/closing direction.

10. The sliding apparatus as claimed in claim 9, wherein the slide plate includes
- a holding part that retains the rear projecting part, and
- a friction reduction part that reduces friction at a part at which a rear surface of the main body part slides relative to a front direction side surface of the holding part in the front/rear direction of the main body part.

* * * * *